(12) United States Patent
Lai et al.

(10) Patent No.: US 11,789,334 B2
(45) Date of Patent: Oct. 17, 2023

(54) CONFIGURABLE GEOMETRIC METASURFACE ANTENNA

(71) Applicant: International Business Machines Corporation, Armonk, NY (US)

(72) Inventors: Kafai Lai, Poughkeepsie, NY (US); Abram L. Falk, Port Chester, NY (US); Damon Brooks Farmer, White Plains, NY (US); Guy M. Cohen, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/481,590

(22) Filed: Sep. 22, 2021

(65) Prior Publication Data
US 2023/0094688 A1    Mar. 30, 2023

(51) Int. Cl.
*G02F 1/29* (2006.01)

(52) U.S. Cl.
CPC .......... *G02F 1/292* (2013.01); *G02F 2202/30* (2013.01)

(58) Field of Classification Search
CPC .............................. G02F 1/292; G02F 2202/30
See application file for complete search history.

(56) References Cited

U.S. PATENT DOCUMENTS

| 10,444,355 | B2 | 10/2019 | Pala et al. |
| 10,663,631 | B2 | 5/2020 | Mikkelsen et al. |
| 10,831,082 | B2 | 11/2020 | Shorokhov et al. |
| 2018/0046056 | A1* | 2/2018 | Na ............................. G02F 1/21 |
| 2019/0025463 | A1 | 1/2019 | She et al. |
| 2019/0079321 | A1* | 3/2019 | Wu ........................ G02F 1/0555 |
| 2020/0227632 | A1 | 7/2020 | Kim et al. |

FOREIGN PATENT DOCUMENTS

WO    2017134506 A1    8/2017

OTHER PUBLICATIONS

Sajjad Abdollahramezani, et al.: "Reconfigurable Multifunctional Metasurfaces Employing Hybrid Phase-Change Plasmonic Architecture"; School Electrical and Computer Engineering; ATL, GA; Sep. 25, 2018; pp. 16.

* cited by examiner

*Primary Examiner* — Jessica M Merlin
(74) *Attorney, Agent, or Firm* — CANTOR COLBURN LLP; L. Jeffrey Kelly (57) ABSTRACT

A tunable metasurface is provided. The tunable metasurface includes a mirror, a dielectric layer disposed on the mirror, a metallic antenna and a phase change material (PCM) layer. The PCM layer is interposed between the dielectric layer and the metallic antenna. The PCM layer is configured to be amorphous or crystalline. The mirror, the dielectric layer, the metallic antenna and the PCM layer cooperatively form a Fabry Perot cavity in which light incident on the metallic antenna from free space is reflected between the mirror and the metallic antenna. The PCM layer has blanket dimensions relative to those of the metallic antenna such that the Fabry Perot cavity is critically coupled with the free space when the PCM layer is only one of amorphous and crystalline.

19 Claims, 5 Drawing Sheets

CONFIGURABLE GEOMETRIC METASURFACE ANTENNA

BACKGROUND

The present invention generally relates to antennas. More specifically, the present invention relates to a configurable geometric metasurface antenna using critical coupling to a weak Fabry Perot cavity.

Chalcogenide phase change materials (PCMs) are a class of materials that undergo a thermally driven crystalline-to-amorphous phase transition and are bistable at room temperature. Chalcogenide PCMs include, but are not limited to, germanium antimony telluride ($Ge_xSb_yTe_z$), germanium telluride ($Ge_xTe_y$), antimony telluride ($Sb_xTe_y$), silver antimony telluride ($Ag_xSb_yTe_z$), silver indium antimony telluride ($Ag_wIn_xSb_yTe_z$), etc. In some embodiments, $Ge_2Sb_2Te_5$ is used for the PCM. In other embodiments, $Ge_3Sb_2Te_2$, GeTe, SbTe, or $Ag_wIn_xSb_yTe_z$ may be used. In the two different phases, both the resistivity and the index of refraction of chalcogenide PCMs and their resistivity is different (e.g., the chalcogenide PCM has a first index of refraction in its amorphous phase and a second index of refraction different than the first index of refraction in its crystalline phase). This difference in index of refraction can be exploited in various technological applications.

In optical technologies, a resonator's coupling strength can be categorized as undercoupled, overcoupled or critically coupled to free space. For a critically coupled resonator, light transmitted through the resonator back to a continuum destructively interferes with light that passes through the continuum without coupling to the resonator, leading to a total attenuation of the transmitted light.

SUMMARY

Embodiments of the present invention are directed to a tunable metasurface. A non-limiting example of the tunable metasurface includes a mirror, a dielectric layer disposed on the mirror, a metallic antenna and a phase change material (PCM) layer. The PCM layer is interposed between the dielectric layer and the metallic antenna. The PCM layer is configured to be amorphous or crystalline. The mirror, the dielectric layer, the metallic antenna and the PCM layer cooperatively form a Fabry Perot cavity in which light incident on the metallic antenna from free space is reflected between the mirror and the metallic antenna. The PCM layer has blanket dimensions relative to those of the metallic antenna such that the Fabry Perot cavity is critically coupled with the free space when the PCM layer is only one of amorphous and crystalline.

Embodiments of the present invention are directed to a tunable metasurface. A non-limiting example of the tunable metasurface includes a mirror, a dielectric layer disposed on the mirror, multiple metallic antennas and a phase change material (PCM) layer. The PCM layer is interposed between the dielectric layer and the multiple metallic antennas. The PCM layer is configured to be amorphous or crystalline. The mirror, the dielectric layer, the multiple metallic antennas and the PCM layer cooperatively form a Fabry Perot cavity in which light incident on the multiple metallic antennas from free space is reflected between the mirror and the multiple metallic antennas. The PCM layer has blanket dimensions relative to each of the multiple metallic antennas such that the Fabry Perot cavity is critically coupled with the free space when the PCM layer is only one of amorphous and crystalline.

Embodiments of the invention are directed to a method of operating a tunable metasurface. The tunable metasurface includes a Fabry Perot cavity with a phase change material (PCM) layer extending beyond metallic antennas and having blanket dimensions relative to each metallic antenna such that the Fabry Perot cavity is critically coupled with free space when the PCM layer is only one of amorphous and crystalline. The method includes independently switching a localized section of the PCM layer on or off with the localized section of the PCM layer amorphous or crystalline, respectively, or with the localized section of the PCM layer crystalline or amorphous, respectively. When the localized section of the PCM layer is on, associated metallic antennas exhibit maximal cross-polarized light reflection and minimal co-polarized light reflection. When the localized section of the PCM layer is off, the associated metallic antennas exhibit minimal cross-polarized light reflection and minimal co-polarized light reflection.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to fabrication processes may or may not be described in detail herein. Moreover, the various tasks and process steps described herein can be incorporated into a more comprehensive procedure or process having additional steps or functionality not described in detail herein. In particular, various steps in the manufacture of antennas are well known and so, in the interest of brevity, many conventional steps will only be mentioned briefly herein or will be omitted entirely without providing the well-known process details.

Turning now to an overview of technologies that are more specifically relevant to aspects of the invention, phase change materials (PCMs) can be used in memory applications in computing technologies. Recently, PCMs have also be used in optical applications to form metasurface holograms of antennas, for example, in order to direct reflected light in two or more directions. This is effectively a form of beam steering by refraction.

A metasurface can include an array of antennas that are designed to each locally shift a phase of an incident beam of light. As a result of these phase shifts, an incident beam of light can be imparted with a 3D structure upon transmission through the metasurface, such as in the case of holograms.

A specific type of metasurface is a geometric metasurface, in which every antenna is identical except for its angle of rotation in the plane of the metasurface. These antennas rely on the geometric phase, otherwise known as the Pancharatnam-Berry (PB) phase where each antenna is designed to flip a circular polarization of incident light (cross-polarization), while imparting a local geometric phase to the beam. This local geometric phase is defined by the rotation angle of the antenna.

For a static metasurface, a PB phase modulation is linear for a cross-polarization component and a goal of the design of the metasurface hologram is to maximize the cross-polarization output and to minimize a co-polarization output to thereby achieve high diffraction efficiency.

A problem exists, however, in that there is an inherent achievable limit of the ability to maximize cross-polarization output while minimizing co-polarization output because maximizing cross-polarized light conversion on a crystalline PCM also increases the same for the amorphous phase. This is due to the fact that normal PCM does not provide sufficient high $\Delta n/\Delta k$ in a visible wavelength range. Indeed, for certain PCMs, a maximum contrast that is achievable for a single antenna is only around 0.5 to 0.6. This situation can be exacerbated by interference when multiple antennas are disposed in close proximity to one another (i.e., about 1 wavelength or less).

Turning now to an overview of the aspects of the invention, one or more embodiments of the invention address the above-described shortcomings of the prior art by providing for a metasurface including an ultrathin layer of PCM with an extended area that is inserted between metallic antennas and the dielectric layer of a Fabry Perot cavity. The thickness of the PCM layer is designed such that the Fabry Perot cavity is critically coupled with free space from which light that is incident on the Fabry Perot cavity is emitted. As such, for each antenna of the metasurface, there is reflection of cross-polarized incident light by the antenna in the on state (i.e., the PCM layer is in the amorphous state or the crystalline state) and zero or near zero reflection of cross-polarized incident light by the antenna in the off state (i.e., the PCM layer is in the crystalline state or the amorphous state).

For purposes of clarity and brevity, the following description will relate to the case in which, for each antenna of the metasurface, there is reflection of cross-polarized incident light by the antenna in the on state (i.e., the PCM layer is in the amorphous state) and zero or near zero reflection of cross-polarized incident light by the antenna in the off state (i.e., the PCM layer is in the crystalline state). However, it is to be understood that the reverse configuration can be in effect and that the description is provided for simplicity of explanation only.

The zero or near zero reflection of cross-polarized incident light by the antenna in the off state results from the high absorption anisotropy of the metallic antenna being conserved with interaction by the PCM layer being suppressed due to the PCM layer being crystalline. With these advantages, multiple antennas can be packed inside a small configurable pixel to enlarge a field of view (FOV) of the hologram generated by the metasurface.

The above-described aspects of the invention address the shortcomings of the prior art by providing for a metasurface with an improved holographic quality resulting from polarization conversion efficiencies of crystalline and amorphous phases of the PCM layer being decoupled. The critical coupling of the Fabry Perot cavity with the free space from which incident light is emitted which occurs due to the formation of the PCM layer provides for significant absorption of incident light and thus minimizes undesired off state cross-polarization.

Figure 1:
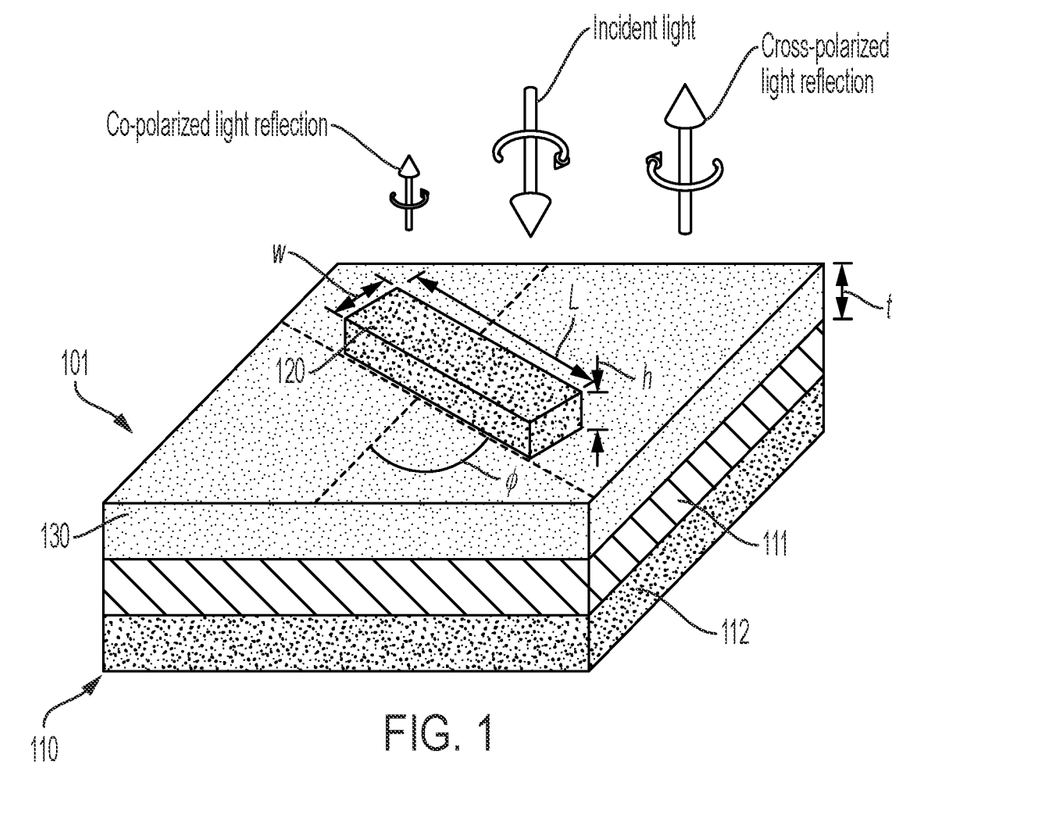
FIG. 1 is a perspective view of a tunable metasurface in accordance with one or more embodiments of the present invention.

Turning now to a more detailed description of aspects of the present invention, FIG. 1 depicts a tunable metasurface 101. The tunable metasurface 101 includes a Fabry Perot cavity 110. The Fabry Perot cavity 110 includes a metallic antenna 120 and a PCM layer 130. The Fabry Perot cavity 110 further includes a dielectric layer 111, which can be provided as an oxide layer, and a mirror 112 disposed adjacent to the dielectric layer 111. The mirror 112 can be formed of various materials including, but not limited to, metals, metallic alloys and dielectrics (as in the case of dielectric Bragg mirrors). For purposes of clarity and brevity, however, the following description will relate to the case in which the mirror 112 is provided as a metallic mirror layer. Thus, the mirror 112 will hereinafter be referred to as the "metallic mirror layer 112." The metallic antenna 120 can include or be provided as gold or another similar metallic material. The PCM layer 130 is interposed between the metallic antenna 120 and the dielectric layer 111 such that the PCM layer 130 and the metallic mirror layer 112 are on opposite sides of the dielectric layer 111.

The PCM layer 130 has blanket (i.e., length and width) dimensions that extend beyond those corresponding dimensions of the metallic antenna 120 and, in some cases, has blanket (i.e., length and width) dimensions that extend well beyond those of the metallic antenna 120. The PCM layer 130 also has a thickness that is provided such that the thickness and the blanket dimensions of the PCM layer 130 cause the Fabry Perot cavity 110 to be critically coupled with free space from which light is incident on the metallic antenna 120.

With the construction described above, when the PCM layer 130 is switched on and in the amorphous state, the metallic antenna 120 exhibits maximal cross-polarized light reflection and minimal co-polarized light reflection and, when the PCM layer 130 is switched off and in the crystalline state, the metallic antenna 120 exhibits minimal cross-polarized light reflection and minimal co-polarized light reflection. In some cases, the metallic antenna 120 exhibits zero cross-polarized light reflection when the PCM layer 130 is switched off and in the crystalline state.

In accordance with one or more embodiments of the present invention, the dielectric layer 111 can be about three times as thick as the metallic mirror layer 112, about twenty times as thick as the metallic antenna 120 and about seven-two hundred times as thick as the PCM layer 130. In accordance with one or more further embodiments of the present invention, the PCM layer 130 can be about 1-30 nm thick or, in some cases, about 1-10 nm thick or, in some other cases, about 1 nm thick. In addition, as shown in FIG. 1, the metallic antenna 120 can be oriented transversely with respect to edges of the PCM layer 130 and can form non-right angles with width and length dimensions of the PCM layer 130.

Figure 2A:
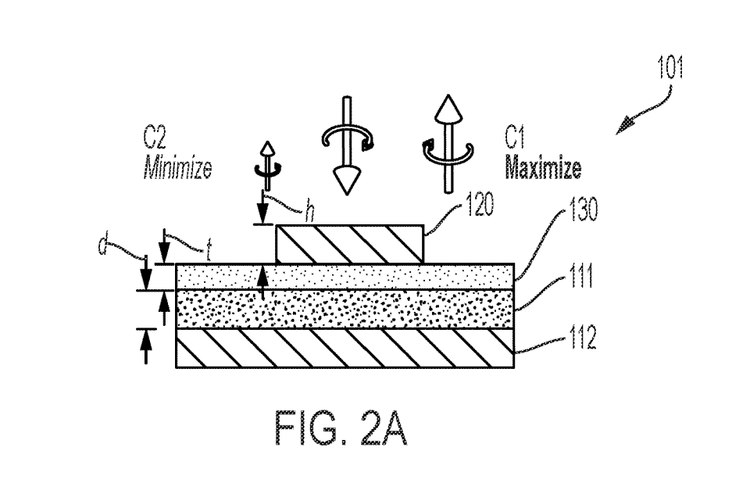
FIG. 2A is a side view of the tunable metasurface of FIG. 1 with a phase change material (PCM) layer in an amorphous state in accordance with one or more embodiments of the present invention.
Figure 2B:
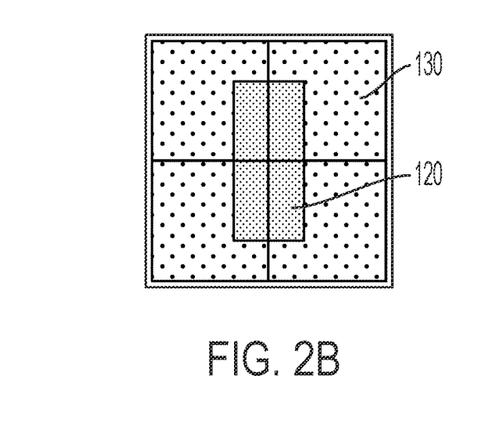
FIG. 2B is a top-down view of the tunable metasurface of FIG. 1 with a phase change material (PCM) layer in an amorphous state in accordance with one or more embodiments of the present invention.
Figure 3A:
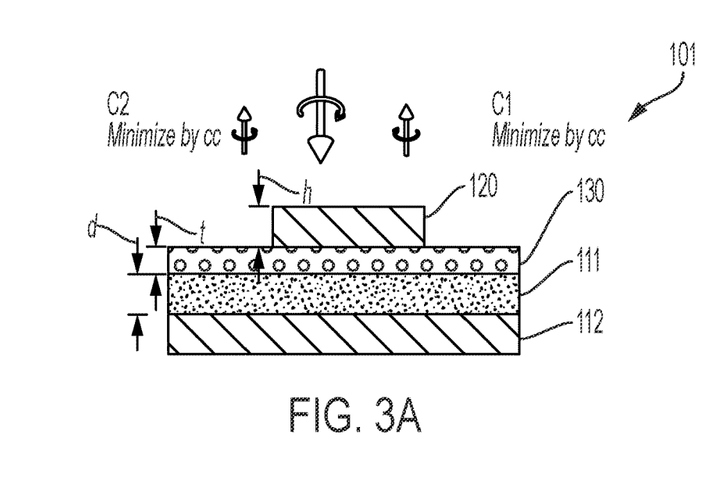
FIG. 3A is a side view of the tunable metasurface of FIG. 1 with a phase change material (PCM) layer in a crystalline state in accordance with one or more embodiments of the present invention.
Figure 3B:
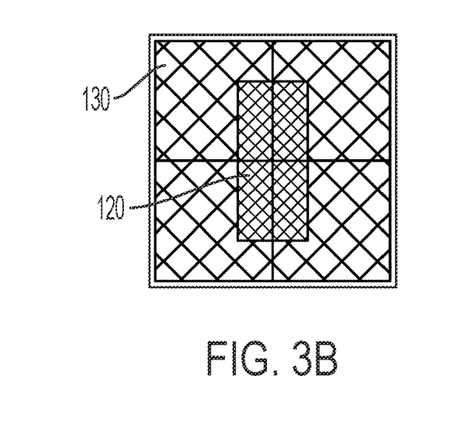
FIG. 3B is a top-down view of the tunable metasurface of FIG. 1 with a phase change material (PCM) layer in a crystalline state in accordance with one or more embodiments of the present invention.

With continued reference to FIG. 1 and with additional reference to FIGS. 2A and 2B and to FIGS. 3A and 3B, operations of the tunable metasurface 101 of FIG. 1 will now be described. As shown in FIGS. 2A and 2B, when the PCM layer 130 is switched on and in the amorphous state, the metallic antenna 120 exhibits maximal cross-polarized light reflection and minimal co-polarized light reflection with respect to light which is incident on the metasurface 101. Conversely, as shown in FIGS. 3A and 3B, when the PCM layer 130 is switched off and in the crystalline state, the blanket dimensions and the thickness of the PCM layer 130 cause the Fabry Perot cavity 110 to be critically coupled with the free space from which the light that is incident on the metasurface 101 is emitted. The results in the light being almost entirely absorbed in the Fabry Perot cavity 110 and in turn results in almost no reflection back to the free space. Thus, in this case, the metasurface 101 exhibits minimal cross-polarized light reflection and minimal co-polarized light reflection (or, in some cases, when the PCM layer 130 is switched off and in the crystalline state, the metallic antenna 120 exhibits zero cross-polarized light reflection).

Figure 4:
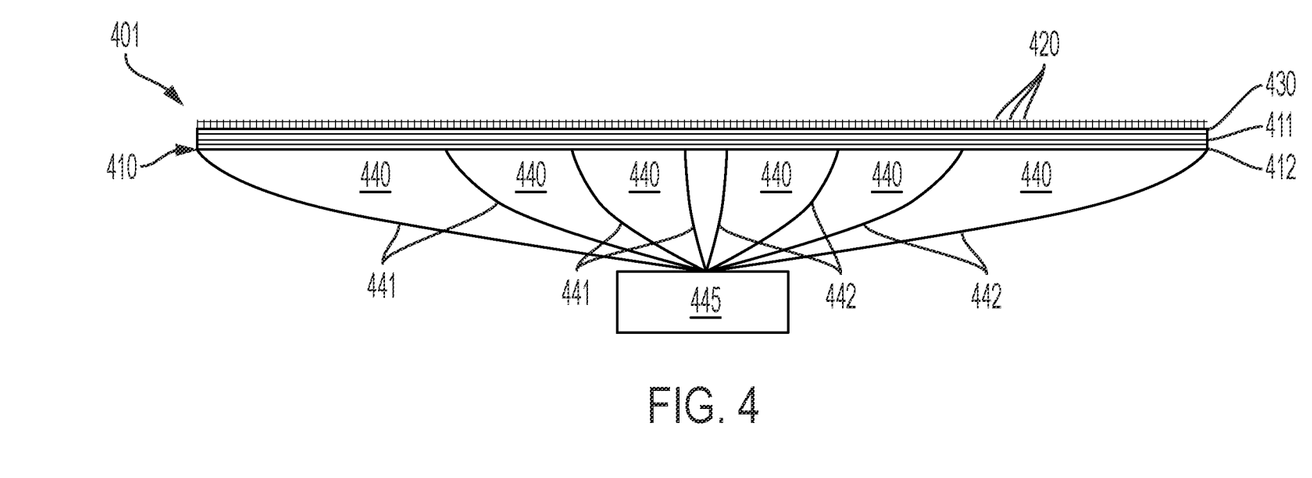
FIG. 4 is a side schematic view of a tunable metasurface with multiple localized sections in accordance with one or more embodiments of the present invention.
Figure 5:
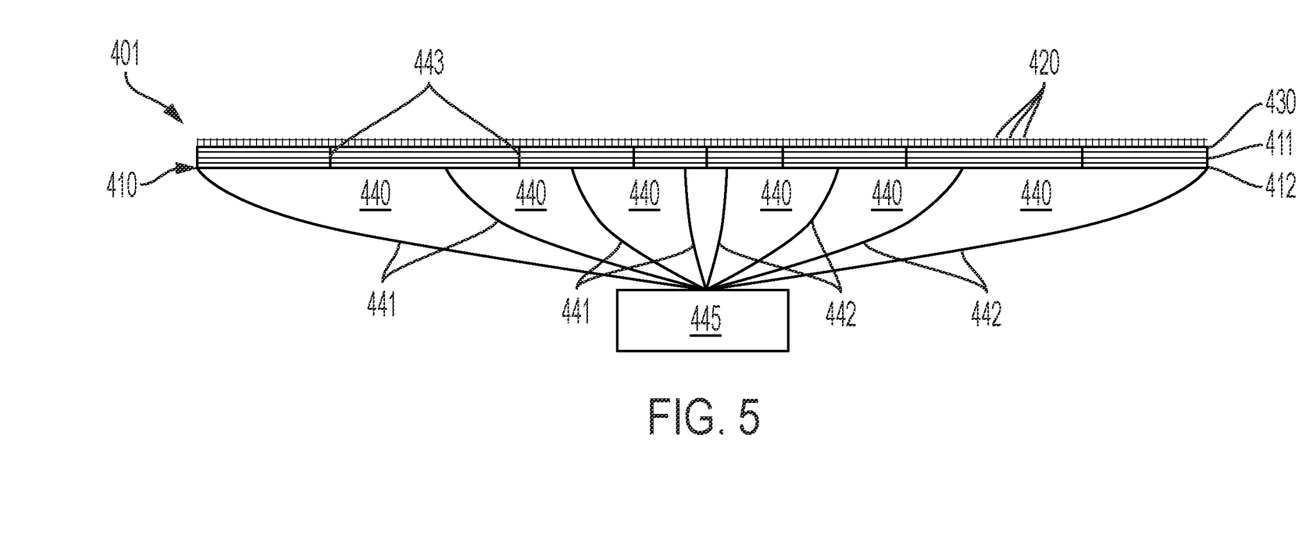
FIG. 5 is a side schematic view of a tunable metasurface with multiple localized sections and discrete wall elements in accordance with one or more embodiments of the present invention.

With reference to FIGS. 4 and 5, a tunable metasurface 401 is provided. The tunable metasurface 401 is generally constructed in a similar fashion as the tunable metasurface 101 of FIG. 1 and includes a Fabry Perot cavity 410. The Fabry Perot cavity 410 includes multiple metallic antennas 420 and a PCM layer 430. The Fabry Perot cavity 410 further includes a dielectric layer 411, which can be provided as an oxide layer, and a mirror 412 (hereinafter referred to as a "metallic mirror layer 412" as noted above) disposed adjacent to the dielectric layer 411. The multiple metallic antennas 420 can each include or be provided as gold or another similar metallic material. The PCM layer 430 is interposed between all of the multiple metallic antennas 420 and the dielectric layer 411 such that the PCM layer 430 and the metallic mirror layer 412 are on opposite sides of the dielectric layer 411. The PCM layer 430 has blanket (i.e., length and width) dimensions that extend beyond all of the multiple metallic antennas 420 and, in some cases, has blanket (i.e., length and width) dimensions that extend well beyond all of the multiple metallic antennas 420. The PCM layer 430 also has a thickness that is provided such that the thickness and the blanket dimensions of the PCM layer 430 cause the Fabry Perot cavity 410 to be critically coupled with free space from which light is incident on the multiple metallic antennas 420.

The Fabry Perot cavity 410 and the PCM layer 430 can each include multiple localized sections 440 that need not be the same shape or size. Each of the multiple localized sections 440 has a set of the multiple metallic antennas 420 associated with it. Each of the multiple localized sections 440 is independently switchable between an on state in which the corresponding section of the PCM layer 430 is amorphous and an off state in which the corresponding section of the PCM layer 430 is crystalline. This independent switching is independent of the switching state of any others of the multiple localized sections 440, including adjacent ones of the multiple localized sections. Thus, as shown in FIGS. 4 and 5, the multiple localized sections 440 can be alternatively switched on and off with their adjacent neighboring ones of the multiple localized sections 440.

In accordance with one or more embodiments of the present invention, each of the multiple localized sections 440 are independently optically switchable (via fiber optic cables 441 or lasers) an/or independently electrically switchable (via electrical wiring 442) between the on and off states under the control of a controller 445. In either case, the multiple localized sections 440 can be delimited by a switching range (see FIG. 4) or by discreet wall elements 443 (see FIG. 5). In the case where the multiple localized sections 440 are range delimited, the sizes and shapes of each of the multiple localized sections are based on the range of the optical/electrical switching stimuli that are applied to the multiple localized sections 440. Conversely, in the case where the multiple localized sections 440 are delimited by the discrete wall elements 443, the discreet wall elements 443 can be provided in the PCM layer 430 and more generally in the Fabry Perot cavity 410.

In whatever way the multiple localized sections 440 are defined and independently controlled, the operations of the tunable metasurface 401 are similar to those described above. When a localized section of the PCM layer 430 is switched on for a given one of the multiple localized sections 440 and the localized section of the PCM layer 430 is therefore in the amorphous state, a set of the multiple metallic antennas 420 associated with the localized section of the PCM layer 430 exhibit maximal cross-polarized light reflection and minimal co-polarized light reflection. Conversely, when the localized section of the PCM layer 430 is switched off for a given one of the multiple localized sections 440 and the localized section of the PCM layer 430 is therefore in the crystalline state, the set of the multiple metallic antennas 420 associated with the localized section of the PCM layer 430 exhibit minimal or zero cross-polarized light reflection and minimal co-polarized light reflection.

In accordance with one or more embodiments of the present invention, the dielectric layer 411 can be about three times as thick as the metallic mirror layer 412, about twenty times as thick as each of the multiple metallic antennas 420 and about seven-two hundred times as thick as the PCM layer 430. In accordance with one or more further embodiments of the present invention, the PCM layer 430 can be about 1-30 nm thick or, in some cases, about 1-10 nm thick or, in some other cases, about 1 nm thick. In addition, the multiple metallic antennas 420 can each be oriented transversely with respect to edges of the PCM layer 430 and can form non-right angles with width and length dimensions of the PCM layer 430.

Figure 6:
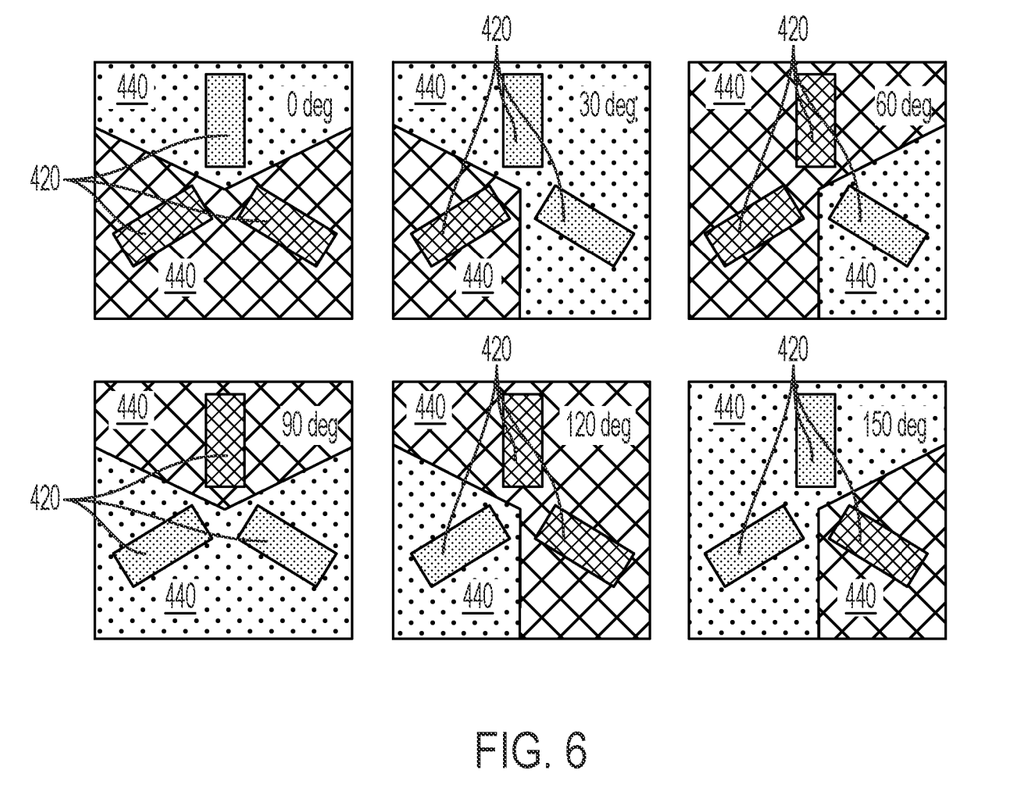
FIG. 6 is a graphical illustration of arrangements of localized sections of a tunable metasurface and multiple metallic antennas in accordance with one or more embodiments of the present invention.

With reference to FIG. 6 and in accordance with one or more further embodiments of the present invention, one or more of the multiple metallic antennas 420 can be transversely oriented with one or more others of the multiple metallic antennas 420 especially when the multiple metallic antennas 420 occupy different ones of the multiple localized sections 440.

Figure 7:
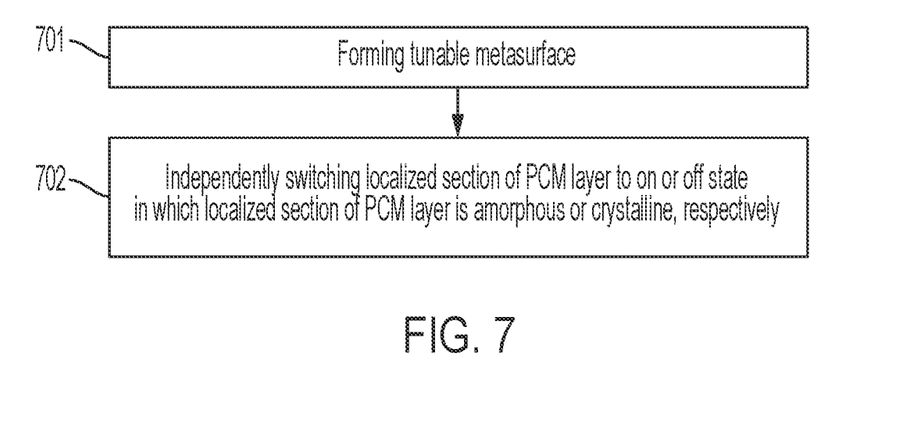
FIG. 7 is a flow diagram illustrating a method of operating a tunable metasurface in accordance with one or more embodiments of the present invention.

With reference to FIG. 7, a method of operating a tunable metasurface is provided. As shown in FIG. 7, the method includes forming the tunable metasurface to include a Fabry Perot cavity with a phase change material (PCM) layer extending beyond metallic antennas and having blanket dimensions relative to each metallic antenna such that the Fabry Perot cavity is critically coupled with free space when the PCM layer is only one of amorphous and crystalline (701). The method further includes independently switching a localized section of the PCM layer to an on or an off state in which the localized section of the PCM layer is amorphous or crystalline, respectively (702). As described above, when the localized section of the PCM layer is switched on, an associated set of the multiple metallic antennas exhibit maximal cross-polarized light reflection and minimal co-polarized light reflection, and, when the localized section of the PCM layer is switched off, the associated set of the multiple metallic antennas exhibit minimal or zero cross-polarized light reflection and minimal co-polarized light reflection.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the invention, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A tunable metasurface, comprising:
a mirror;
a dielectric layer disposed on the mirror;
a metallic antenna; and
a phase change material (PCM) layer interposed between the dielectric layer and the metallic antenna and configured to be amorphous or crystalline,
the mirror, the dielectric layer, the metallic antenna and the PCM layer cooperatively forming a Fabry Perot cavity in which light incident on the metallic antenna from free space is reflected between the mirror and the metallic antenna, and
the PCM layer has blanket dimensions relative to those of the metallic antenna such that the Fabry Perot cavity is critically coupled with the free space when the PCM layer is only one of amorphous and crystalline,
wherein the Fabry Perot cavity comprises multiple localized sections and each of the multiple localized sections has a set of the multiple metallic antennas associated therewith.

2. The tunable metasurface according to claim 1, wherein:
when the PCM layer is amorphous, the metallic antenna exhibits maximal cross-polarized light reflection and minimal co-polarized light reflection, and
when the PCM layer is crystalline, the metallic antenna exhibits minimal cross-polarized light reflection and minimal co-polarized light reflection.

3. The tunable metasurface according to claim 1, wherein:
when the PCM layer is crystalline, the metallic antenna exhibits maximal cross-polarized light reflection and minimal co-polarized light reflection, and
when the PCM layer is amorphous, the metallic antenna exhibits minimal cross-polarized light reflection and minimal co-polarized light reflection.

4. The tunable metasurface according to claim 1, wherein the mirror is adjacent to the dielectric layer opposite the PCM layer.

5. The tunable metasurface according to claim 4, wherein the dielectric layer comprises oxide and the metallic antenna comprises gold.

6. The tunable metasurface according to claim 4, wherein the dielectric layer is about three times as thick as the mirror, about twenty times as thick as the metallic antenna and about seven-two hundred times as thick as the PCM layer.

7. The tunable metasurface according to claim 1, wherein the PCM layer is about 1-30 nm thick.

8. The tunable metasurface according to claim 1, wherein the metallic antenna forms non-right angles with width and length dimensions of the PCM layer.

9. A tunable metasurface, comprising:
a mirror;
a dielectric layer disposed on the mirror;
multiple metallic antennas; and
a phase change material (PCM) layer interposed between the dielectric layer and the multiple metallic antennas and configured to be amorphous or crystalline,
the mirror, the dielectric layer, the multiple metallic antennas and the PCM layer cooperatively forming a Fabry Perot cavity in which light incident on the multiple metallic antennas from free space is reflected between the mirror and the multiple metallic antennas, and
the PCM layer has blanket dimensions relative to each of the multiple metallic antennas such that the Fabry Perot cavity is critically coupled with the free space when the PCM layer is only one of amorphous and crystalline,
wherein the Fabry Perot cavity comprises multiple localized sections and each of the multiple localized sections has a set of the multiple metallic antennas associated therewith.

10. The tunable metasurface according to claim 9, wherein the multiple localized sections are independently switchable between on and off states in which the corresponding section of the PCM layer is amorphous and crystalline, respectively, or in which the corresponding section of the PCM layer is crystalline and amorphous, respectively.

11. The tunable metasurface according to claim 10, wherein each of the multiple localized sections are optically or electrically switchable between the on and off states.

12. The tunable metasurface according to claim 9, wherein:
when a localized section of the PCM layer is amorphous, a set of the multiple metallic antennas associated with the localized section of the PCM layer exhibit maximal cross-polarized light reflection and minimal co-polarized light reflection, and
when the localized section of the PCM layer is crystalline, the set of the multiple metallic antennas associated with the localized section of the PCM layer exhibit minimal cross-polarized light reflection and minimal co-polarized light reflection.

13. The tunable metasurface according to claim 9, wherein:
when a localized section of the PCM layer is crystalline, a set of the multiple metallic antennas associated with the localized section of the PCM layer exhibit maximal cross-polarized light reflection and minimal co-polarized light reflection, and
when the localized section of the PCM layer is amorphous, the set of the multiple metallic antennas associated with the localized section of the PCM layer exhibit minimal cross-polarized light reflection and minimal co-polarized light reflection.

14. The tunable metasurface according to claim 9, wherein the mirror is adjacent to the dielectric layer opposite the PCM layer.

15. The tunable metasurface according to claim 14, wherein the dielectric layer comprises oxide and the multiple metallic antennas comprise gold.

16. The tunable metasurface according to claim 14, wherein the dielectric layer is about three times as thick as the mirror, about twenty times as thick as each of the multiple metallic antennas and about seven-two hundred times as thick as the PCM layer.

17. The tunable metasurface according to claim 9, wherein the PCM layer is about 1-30 nm thick.

18. The tunable metasurface according to claim 9, wherein:
the multiple metallic antennas form non-right angles with width and length dimensions of the PCM layer,
and one or more of the multiple metallic antennas are transversely oriented with one or more others of the multiple metallic antennas.

19. A tunable metasurface, comprising:
a mirror;
a dielectric layer disposed on the mirror;
a metallic antenna; and
a phase change material (PCM) layer interposed between the dielectric layer and the metallic antenna and configured to be amorphous in an on phase of the PCM and to be crystalline in an off phase of the PCM,
the mirror, the dielectric layer, the metallic antenna and the PCM layer cooperatively forming a Fabry Perot cavity in which light incident on the metallic antenna from free space is reflected between the mirror and the metallic antenna, and
the PCM layer has blanket dimensions relative to those of the metallic antenna such that the Fabry Perot cavity is critically coupled with the free space when the PCM layer is crystalline in the off phase of the PCM.

* * * * *